United States Patent [19]

Manson et al.

[11] Patent Number: 5,731,997
[45] Date of Patent: Mar. 24, 1998

[54] METHOD AND APPARATUS FOR COLLECTING RECORDING AND DISPLAYING DATA PERTAINING TO AN ARTIFACT

[75] Inventors: Paul Robin Manson, Fendalton; Richard David Williams, Merivale; Jonathan Miles Marshall, Bryndwr, all of New Zealand

[73] Assignee: Trimble Navigation Limited, Sunnyvale, Calif.

[21] Appl. No.: 618,105

[22] Filed: Mar. 19, 1996

[51] Int. Cl.$^6$ .................. H04B 10/105; G01C 3/00
[52] U.S. Cl. .......... 364/559; 455/12.1; 364/449.2; 364/449.7; 395/348; 395/349
[58] Field of Search ................. 364/559, 560, 364/449.1, 449.2, 449.7, 449.9; 342/357, 457, 118, 46, 57; 455/12.1; 395/326, 339, 340, 348, 349

[56] References Cited

U.S. PATENT DOCUMENTS

| | | | |
|---|---|---|---|
| 5,214,757 | 5/1993 | Mauney et al. | 395/161 |
| 5,528,248 | 6/1996 | Steiner et al. | 342/357 |
| 5,528,518 | 6/1996 | Bradshaw et al. | 364/561 |
| 5,589,835 | 12/1996 | Gildea et al. | 342/357 |
| 5,623,590 | 4/1997 | Becker et al. | 395/326 |

OTHER PUBLICATIONS iotech, "IEEE 488 & Data Acquisition Catalog", pp. 210–211, 1995.

Omega Engineering, "vol. 27 Supplement", pp. F–39–F40, 1991.

"Mobile Computer Collects Field Data", Pipeline & Gas Journal Apr. 1995.

Marshall et al., "Improved Mapping Programs Grow Apart", Infoworld, Sep. 19, 1994.

Reason, "Data Collection in the Field", Electrical World, Feb. 1995.

ASPEN–GPS System Operation Manual, Trimble Navigation Limited, Revision A, Jul. 1995.

ASPEN Field Software User Guide, Trimble Navigation Limited, Revision A, Version 1.11, Jul. 1995.

*Primary Examiner*—James P. Trammell
*Assistant Examiner*—Patrick Assouad
*Attorney, Agent, or Firm*—Blakely, Sokoloff, Taylor & Zafman

[57] ABSTRACT

A new and useful method and apparatus are provided for collecting, recording and displaying data pertaining to artifacts in a time based fashion. The apparatus includes a data measurement device such as a GPS receiver or other measurement device for collecting data such as position information pertaining to artifacts, a memory for recording collected data and a user interface having an input for receiving recorded information such as qualitative information pertaining to artifacts from the user and a display for displaying the collected data as it is collected by a user. The user interface includes a time scale to associate the data collected pertaining to the artifacts with the time at which the data was collected providing a useful project management tool for the user as well as for management personnel supervising the user and for providing an accurate time based archival record of data pertaining to artifacts such as their location and physical condition.

46 Claims, 18 Drawing Sheets

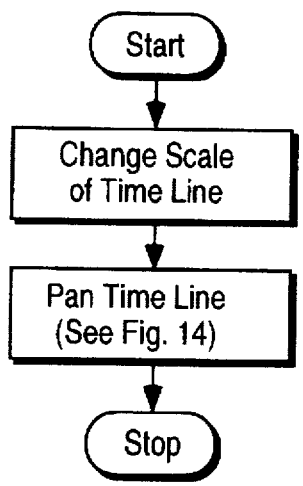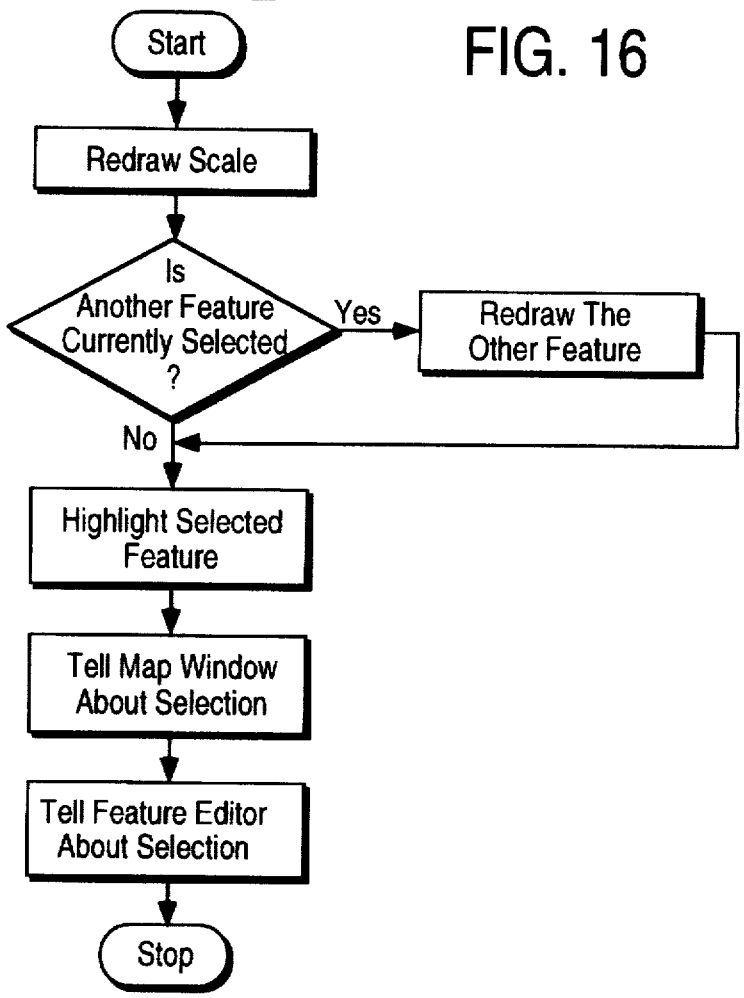

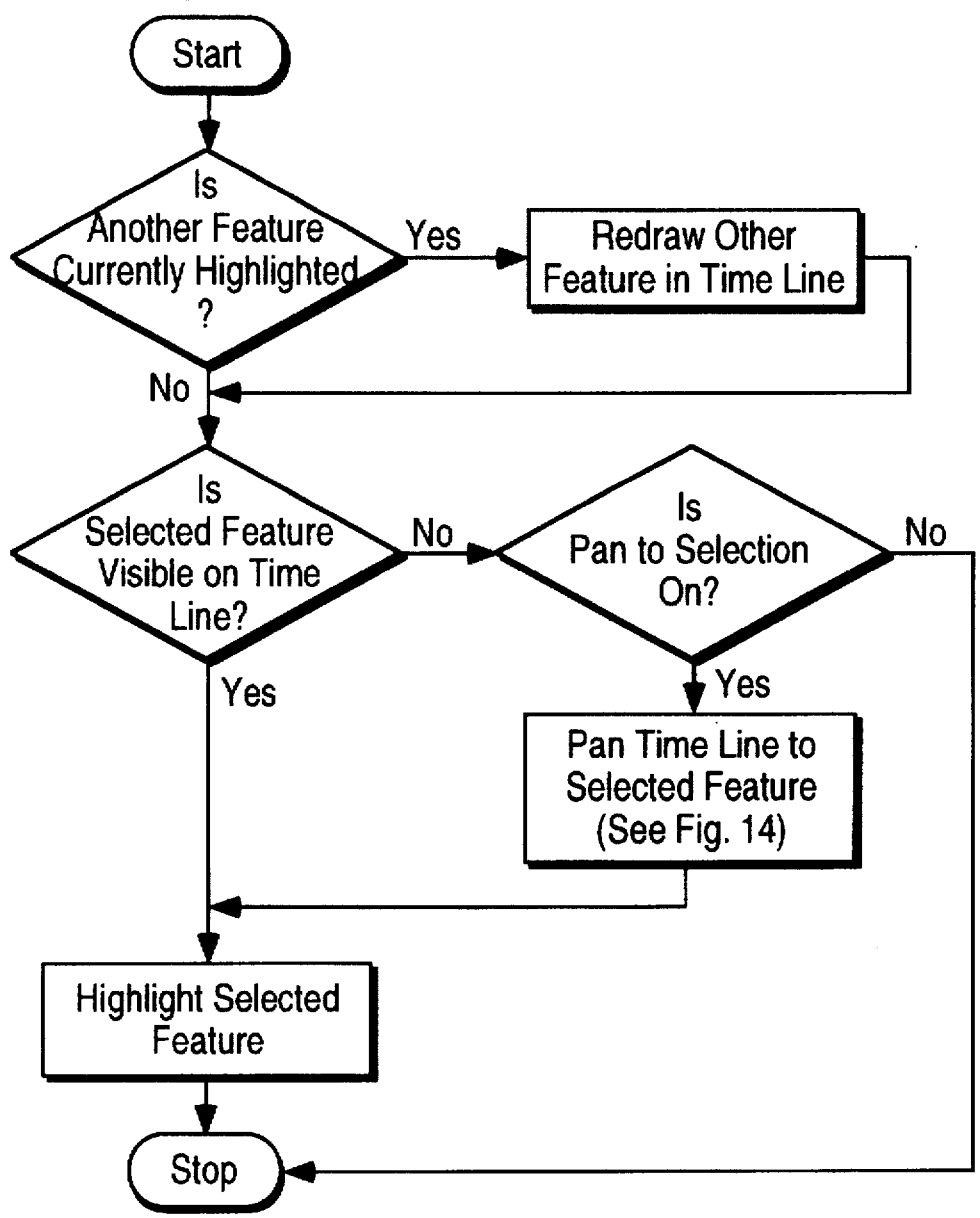

METHOD AND APPARATUS FOR COLLECTING RECORDING AND DISPLAYING DATA PERTAINING TO AN ARTIFACT

BACKGROUND OF THE INVENTION

1. Field of the Invention

The present invention relates generally to user interfaces for information collection devices and, more particularly, to a data collection device configured to collect, store and display information in relation to the time at which the information is collected.

2. Background

A user interface is something which bridges the gap between a human user who seeks to control a device and the hardware and/or software which actually controls the device. The familiar keypad of a touch tone telephone and the alphanumeric keyboard associated with a personal computer are such user interfaces. In addition to hardware components, graphical user interfaces have become an increasingly common feature of personal computers. Such interfaces are provided either as built-in portions of the computer operating system, as in the case of the Macintosh computer available from Apple Computer Inc. of Cupertino, Calif., or as add-on software products that can be purchased separately.

Regardless of whether the user interface is a hardware device or a software program (or, as is increasingly the case, a combination of both), the purpose of the user interface is, as indicated, to bridge the gap between the human operator and the device being utilized. For example, graphical user interfaces used with personal computers often have the ability to initiate execution of other, so-called, "applications programs". Examples of application programs might be spreadsheets, word processing programs, database programs, etc. The process of initiating execution of an application program is typically handled through the use of small graphical symbols known as "icons". The graphical user interface displays the icons on the computer screen, one icon for each application program that can be run. The human user initiates execution of an application program by selecting the corresponding icon, most often using a pointing device such as a mouse.

A conventional graphical user interface such as described above significantly reduces the amount of information that a user must recall in order to effectively use the computer. For example, instead of remembering the name of an application program, and the location of the program on a particular disk, the user need only remember that a particular icon is associated with the application program.

Like their graphical counterparts, hardware user interfaces also allow for ease of operation. For example, the familiar mouse associated with a personal computer allows a user to position the cursor and select from among the various icons displayed on a screen. By using the mouse the user is able to avoid having to perform a number of complex keystrokes.

An example of a user interface of potentially immense utility is in conjunction with a data collection device used by a field worker while collecting information in remote location. For example, surveying property to record information on features such as boundaries and artifacts located on the property could be facilitated with a convenient user interface. Collecting information while out on a data collection project by using any means other than electronic collection devices requires extensive note taking in journals or maps that makes it cumbersome to perform the collection and recording task.

It is often useful to be able to record data and notes on electronic devices such as portable computers, notebooks, or simple electronic recording devices to simplify the effort a field worker must perform to record data. The data collected can then be stored for later retrieval by a parent system that can be used to disseminate and interpret the data into useful information for decision making. In many of these applications, a time based record of the data collected would be quite useful for tracking factors such as productivity of the data collecting technicians, the qualities related to changing data over time as well as other factors. Data collecting devices that incorporate measuring instruments such as land surveying devices known as Total Stations, Laser rangefinders, direction finding beacons, compasses, tape measures and other such devices would be greatly improved if they had the capability of noting the time when the date it was collected.

A surveying device that collects data pertaining to artifacts located on real property such as trees and buildings as well as to boundaries, both natural and artificially defined would be greatly improved by a device that was able to collect, display and record data with reference to the time at which the data was collected. If available in real time the information could then be used by the operator in the field to track the data collection to ensure an organized and complete survey. The information could also be used by the operator as well as management overseeing the operator to modify the operator's operation for higher efficiency by reducing the time required to collect data as well as organizing and keeping track of data collected. Furthermore, the information would be a useful archival record of a property's physical history. The introduction of advanced geographic location systems such as a global positioning system could add another dimension to the survey operator's capability.

The global positioning system (GPS) is a multiple satellite based radio positioning system in which each GPS satellite transmits data that allows a user to precisely measure the distance from selected ones of the GPS satellites to his or her receiver antenna and, thereafter, to compute position, velocity, and time parameters to a high degree of accuracy using known triangulation techniques. The signals provided by the GPS satellites can be received both globally and continuously.

In general, each GPS satellite transmits signals on two frequencies known as L1 and L2. The signals are transmitted using spread spectrum techniques that employ two types of spreading functions. Course acquisition (C/A) and precise (P) pseudorandom noise (PRN) codes are transmitted on frequency L1 and the P code only is transmitted on frequency L2. The C/A code is available to any user, military or civilian, however, the P code is available only to authorized military and civilian users. Both the P and C/A codes contain data that enable a receiver to determine the range between a selected satellite and the user. Superimposed on both the P and the C/A codes is the navigation message. The navigation message contains GPS system time; a hand over word used in connection with transitioning from C/A code to P code tracking; ephemeris data for the particular satellite being tracked; and almanac data for all the satellites in the GPS constellation.

GPS finds use in a wide variety of applications, including space, air, sea and land vehicle navigation, precise positioning, time transfer, attitude reference, surveying, etc. Within these various disciplines, a number of prior GPS receivers are known. These include sequential tracking receivers, continuous reception receivers, multiplexing receivers, all-in-view receivers, time transfer receivers, and surveying receivers.

GPS receivers typically comprise a number of subsystems. These include an antenna assembly, an RF assembly, and a GPS processor assembly. The antenna assembly receives the L-band GPS signal and amplifies it prior to insertion into the RF assembly. The RF assembly mixes the L-band GPS signal down to a convenient intermediate frequency (IF). Then, using various known techniques, the PRN code modulating the L-band signal is tracked through code correlation to measure the time of transmissions of the signals from the satellite. The Doppler shift of the received L-band signal is also measured through a carrier tracking loop. The code correlation and carrier tracking functions can be performed using either analog or digital processing means.

The control of the code and carrier tracking loops is provided by the GPS processor assembly. By differencing this measurement with the time of reception, as determined by the receiver's clock, the pseudo range between the receiver and the satellite being tracked may be determined. This pseudo range includes both the range to the satellite and the offset of the receiver's clock from the GPS master time reference. The pseudo range measurements and navigation data from four satellites are usually sufficient to compute a three-dimensional position and velocity fix, to calibrate the receiver's clock offset, and to provide an indication of GPS time.

In some known receivers, the receiver processor controller functions are performed using a computer separate from that on which the navigation functions are performed. In other known receivers, both types of functions are performed by a single processor. Regardless of the system used, the receiver processor controller functions typically include monitoring channel status and control, signal acquisition and reacquisition, code and carrier tracking loops, computing pseudo range and delta range measurements, determining data hedge timing, acquisition and storage of almanac and ephemeris data broadcast by the satellites, processor control and timing, address and command decoding, timed interrupt generation, interrupt acknowledgment control, and GPS timing.

Known GPS receivers also perform navigation processing functions including satellite orbit calculations and satellite selection, atmosphere delay correction calculations, navigation solution computation, clock bias and rate estimates, computation of output information, and preprocessing and coordinate conversion of aiding information.

The GPS standard positioning service provides a navigation accuracy of 100 meters. A number of applications of GPS (including surveying) require higher levels of accuracy. Accuracy can be improved using a technique known as differential GPS. This technique involves operating a GPS receiver and a known location. The receiver is used to compute satellite pseudo range correction data using prior knowledge of the correct satellite pseudo ranges, which are then broadcast to users in the same geographic area. The pseudo range corrections are incorporated into the navigation solution of another GPS receiver (a remote receiver) to correct the observed satellite pseudo range measurements, thereby improving the accuracy of the position determination of the remote. Correlation of the errors experienced at the reference station and at the remote is dependent upon the distance between them, however they are normally highly correlated for a user within 350 kilometers of the reference station.

As indicated above, GPS receivers have been used to aid in the surveying process. In the past, a surveyor could take a GPS receiver into the field, position the receiver's antenna at a desired location, switch on the receiver to gather position data for the given location, and ultimately arrive at a location fix for the position of the GPS receiver's antenna. Very often, such surveying techniques are carried out in conjunction with city planning operations, such as the monitoring of the condition of city assets, often referred to in the trade as artifacts, for example, utility poles, manhole covers, etc. Thus, a surveyor could position his GPS receiver antenna over a manhole cover and determine a location fix for the manhole cover and other information of interest. At the same time, the surveyor could record in a field notebook the condition of the manhole cover. Collecting data pertaining to the artifacts is referred to in the profession as "capturing" the artifacts. Later, in an office setting, the position information could be correlated with the condition information for the manhole cover and similar results for other city artifacts could be combined together to produce an overall report for the city engineers or other interested persons regarding the location and condition of the manhole covers.

The above process is not only time consuming, but there exists the danger that the surveyor's notebook will be lost or the data will not be accurately transferred from the notebook to the report. For example, location data associated with one artifact may be improperly associated with attribute information for a different artifact. Accordingly, a need exists for a single surveying apparatus which can compile and associate position information for an artifact of interest together with other attribute information in the field environment. A user interface would also be useful in helping the surveyor in the field to organize the survey logistics as well as the data collected.

For the surveying process discussed above, it would be useful to the user as well as managing personnel to record in a time based record the events of a particular survey using a helpful user interface that can streamline the process of collecting data for a series of artifacts. It would be useful to have a record of not only what was surveyed, but also the time that was spent on each artifact recorded in the field. During the data collection activities, the surveyor in the field could know whether enough time has passed to achieve the proper accuracy of position for a given artifact. Furthermore, particular surveys could be investigated regarding whether enough time was spent at a particular artifact in order to achieve the proper accuracy of position, whether too much time was wasted in gathering useless information, or whether a particular surveyor in the field is properly performing his duties. It would also be useful to give the surveyor in the field a real time map to refer to in order help keep track of the survey project as a whole. In combination with the time based record, the field worker could even backtrack and take new measurements of artifacts that were inaccurately gathered at an earlier point in time. The time based information could also serve as a useful archival record of changing conditions in a surveyed field over time. As will be seen in the specification below, the present invention addresses these needs in a novel and elegant manner.

SUMMARY OF THE INVENTION

The present invention in one embodiment provides a new and useful device and method for collecting data and for recording and displaying time based information collected during a field study. In a more specific embodiment, the present invention provides a survey device and method of collecting data pertaining to land surveying such the geographic location of artifacts located on a land area using GPS technology and related conditions of the artifacts. The device includes a GPS data gathering device for gathering location data of artifacts in the field. The device includes a microprocessor for processing the position information in a format that can be displayed on a user screen. The time based information is generated by the device using a clock that generates timing information recorded by the survey device in parallel with the position information as it is gathered by a user. When associated together, the clock output and the position information allow the device to generate a Time Line on a display that displays icons representing artifacts and the time which they were surveyed. Using the position information, the device generates a map display showing the artifacts on the map as they are gathered. Both the Time Line display and the map display are recorded by the device as they are created for posterity.

BRIEF DESCRIPTION OF THE DRAWINGS

FIG. 15 is a flow diagram illustrating the steps necessary to zoom the Time Line in accordance with one embodiment of the present invention;

FIG. 16 is a flow diagram illustrating the steps necessary to select a feature in the Time Line in accordance with one embodiment of the present invention;

FIG. 17 is a flow diagram illustrating the steps necessary to select a feature in the map or feature editor in accordance with one embodiment of the present invention;

DETAILED DESCRIPTION

Figure 1:
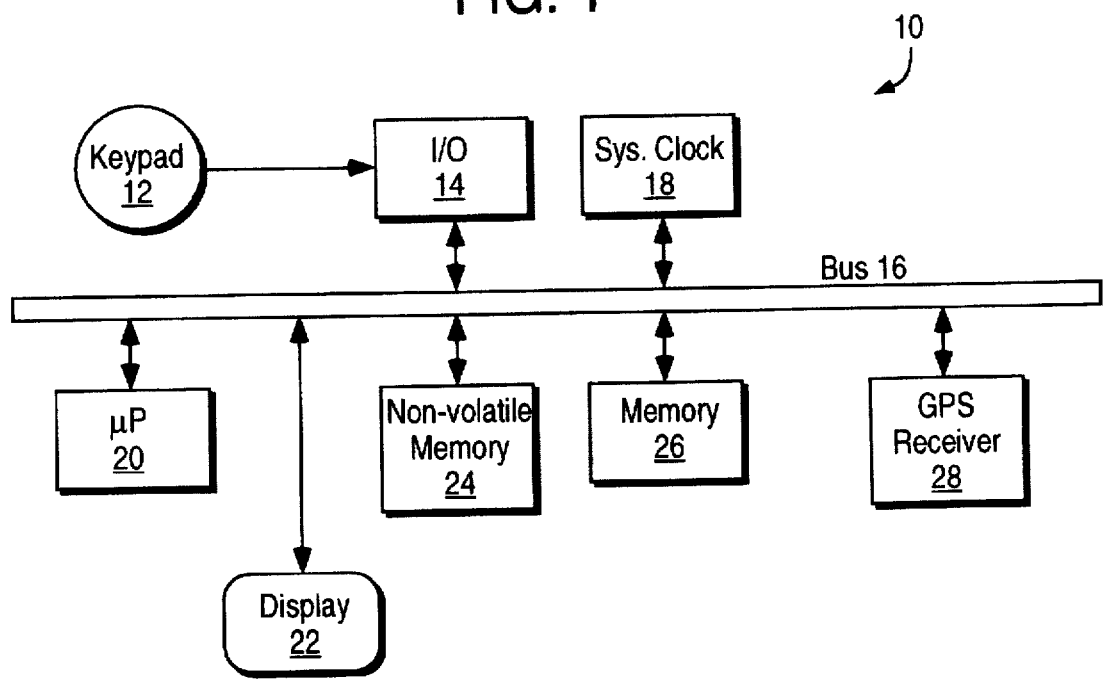
FIG. 1 shows a surveying apparatus of the present invention.

A survey device is provided for collecting data pertaining to artifacts located on land areas and boundaries of the land areas. In the following description, many specific details are set forth, such as various computer components, in order to provide a thorough understanding of the present invention. It will be appreciated, however, by those skilled in the art, that the present invention may be practiced without such specific details. In other instances, well known control structures and encoding techniques have not been described in detail in order not to unnecessarily obscure the present invention. Also, although a particular embodiment is disclosed in the discussion below and illustrated in the drawings of FIGS. 1 through 19, it will be appreciated by those skilled in the art of data collection technology, that the present invention described in the description and shown in the drawings, when read in light of the background set forth above and within the scope of the claims, can also be implemented using a variety of data gathering devices such as the GPS device described below, surveying devices known as Total Stations, LASER range-finders, direction finding beacons, compasses, tape measures and other data collection devices without departing from the spirit and scope of the present invention.

One embodiment of the present invention provides a Time Line window of display illustrating a chronological view of artifacts surveyed in the field along with their pertinent features and associated recorded notes. Referring to FIG. 1, survey device 10 includes a keypad 12 for receiving input from a user. This keypad communicates with the survey device 10 via a general purpose input/output (I/O) controller 14 that sends information through the bus 16. A system clock 18 sends signals to system bus 16 for recording and display. A microprocessor 20 is provided to control the survey device by communicating with other units via bus 16. The survey device 10 also includes a display 22 for displaying a Fine Line display to the user while collecting and recording data.

The survey device also includes a non-volatile memory 24 and a main memory 26. The survey device is also a data collection device that includes a GPS receiver 28 also communicating with the other units via bus 16. It will be appreciated that the operating system software and other software needed for operation of survey device 10 will be loaded into the non-volatile memory 24 prior to use. Non-volatile memory 28 may also include other start up code to be executed by microprocessor 20 on power up.

GPS receiver 28 comprises a number of sub-systems familiar to those skilled in the art. This includes an antenna assembly, an RF assembly, and a GPS processor assembly. In other embodiments, microprocessor 20 may perform some or all of the functions of the GPS processor assembly. In general, GPS receiver 28 operates as a typical GPS receiver. That is, the antenna assembly receives the L-band GPS signals and amplifies these signals prior to insertion into the RF assembly. The RF assembly mixes the L-band GPS signal down to an intermediate frequency. Then, using various known techniques, the PRN code modulating the L-band signal is tracked to measure the time of transmission of the signal from the GPS satellite. The Doppler shift of the received L-band signal may also be measured through a carrier tracking loop. These functions may be performed using either analog or digital processing and, as indicated, may be performed by microprocessor 20.

GPS receiver 28 may function as a differential GPS receiver. As such, GPS receiver 28 may, in addition to receiving signals from GPS satellites, receive signals from a base station (not shown) operating in a known location. GPS receiver 28 will use the signals from the base station to compute satellite pseudo range correction data using techniques well known in the art. The pseudo range corrections will be incorporated into the navigation solution derived from the GPS satellite signals, thereby improving the accuracy of the position determination.

Alternatively, GPS receiver 28 could be a GPS translator. In such an embodiment, GPS receiver 28 would include only the antenna assembly and RF assembly portions of a standard GPS receiver. In such a case, the position calculation determination could be made by microprocessor 20 or, could be made at a base station (not shown). For the remainder of the discussion which follows, however, it will be assumed that GPS receiver 28 functions as a standard GPS receiver and makes the required position calculations.

In one embodiment, surveying device 10 comprises a self contained unit which is easily transportable. Ideally, surveying device 10 can be easily carried into the field for use by surveyors. As will be described below, keypad 12 and I/O controller 14 comprise one embodiment of a user interface for surveying device 10. The interface serves as a user interface for surveying device 10 and allows an operator to control the operation of surveying device 10 as described below.

Figure 2:
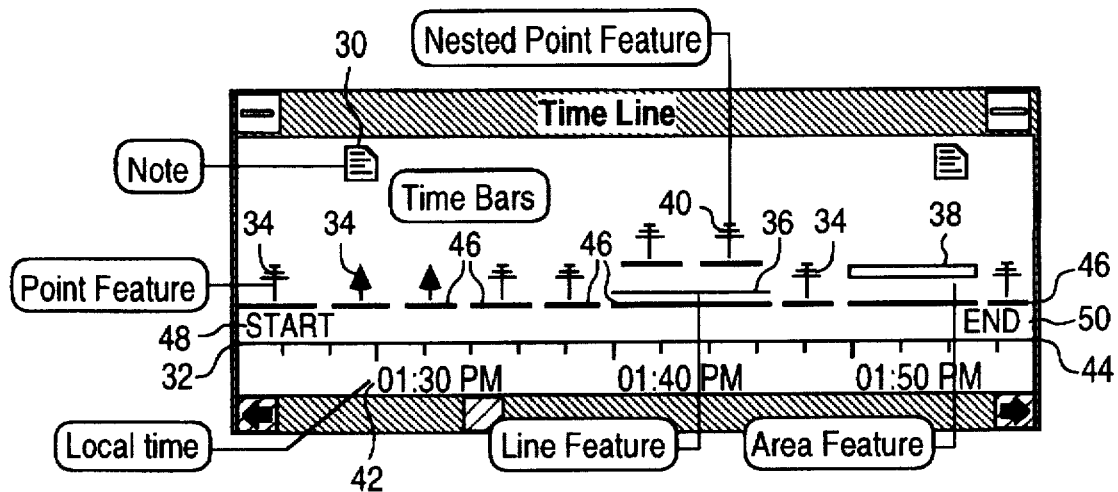
FIG. 2 is a depiction of the Time Line display in accordance with one embodiment of the present invention.

Referring now to FIG. 2 and subsequent figures, a preferred method of surveying using surveying device 10 will be described. Upon reviewing the details of this method, however, others skilled in the art will recognize that the display window of FIG. 2 and subsequent figures represent only one embodiment of the apparatus and method of the present invention and will further recognize that various modifications to the steps described could be implemented without departing from the spirit and scope of the invention.

Referring to FIG. 2, an example of how a Time Line display can be set up to display relevant data to the user is shown including notes 30, time bars 32, point features such as trees and telephone poles 34, line features representing boundaries 36, area features representing closed boundaries, nested point features 40 that are captured while capturing a line or area feature, local time 42 and other features. The horizontal axis 44 of the Time Line display represents the sequential passage of time and each recorded feature and note 30 is displayed above this axis in the appropriate position according to the time in which they were captured during a survey. Features and notes appear on the Time Line window as icons that a user designates as pertaining to a particular artifact. Notes pertaining to an artifact appear at the point in time when they were crested, whereas features appear with an indication of the period of time during which they were captured as shown by the time bars 46.

The Time Line window can display both static and dynamic information. Static information can consist of notes and features which have previously been recorded in a data file, whereas dynamic information can consist of features which are currently being recorded.

Figure 3:
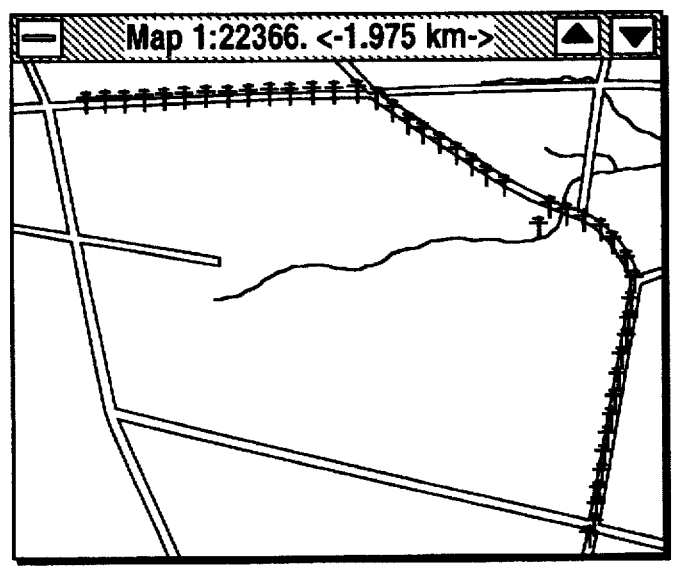
FIG. 3 is a depiction of the map display in accordance with one embodiment of the present invention.

The chronological view of data provided by the Time Line window display of FIG. 2 is complementary to the spatial view of the data displayed by the map window display of FIG. 3. The contents of these two windows are synchronized, so that a selected object in one window display will also be selected in the other.

The time axis and scale appear along the bottom of the Time Line window, with time advancing from left to right. The word "Start" 48, just above the time axis, indicates the beginning of the displayed data file. There is a corresponding "End" 50, if the file was captured previously and has been opened for viewing or editing only. If the file is newly created or has been opened for appending, then the word "Now" (not shown) will appear on the Time Line to indicate the current point in time; in this case the word "End" will not appear.

Figure 4:
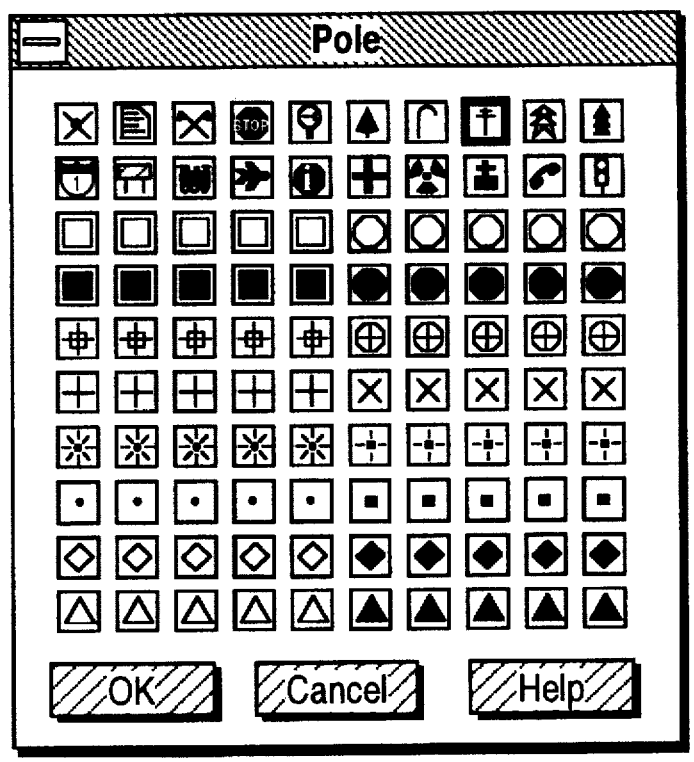
FIG. 4 is a depiction of an icon library in accordance with one embodiment of the present invention.

Each recorded feature is indicated in two ways: firstly with a "time bar", which indicates the period of time which elapsed between the starting of the feature and the ending of the feature, and secondly with an icon for point features, a line for line features or a rectangle for area features. The symbol or icon displayed for each type of point feature can be configured by the user, and is the same as the symbol displayed on the Map window for that feature type. Icons can be selected from an icon library as shown in FIG. 4. For example, the tree features in the sample Time Line of FIG. 1 appear with a tree icon. The color used for line and area features can similarly be configured by the user and matches the color used for displaying these features on the Map window of FIG. 3. For example, the area feature 38 in the sample Time Line of FIG. 2 represents a pond represented as a closed line area and can appear in blue on a colored display.

Features appear on the Time Line in two layers, as the survey device software allows the user to record one or more point features within a line or area feature. This action, called "nesting", avoids the need to record an entire line or area feature and then backtrack to record any points of interest which appeared along that line or area. The sample Time Line of FIG. 2 illustrates a "tree" feature 40 which was nested inside a "curb" feature 36. A multitude of variations on this theme are possible.

Figure 5:
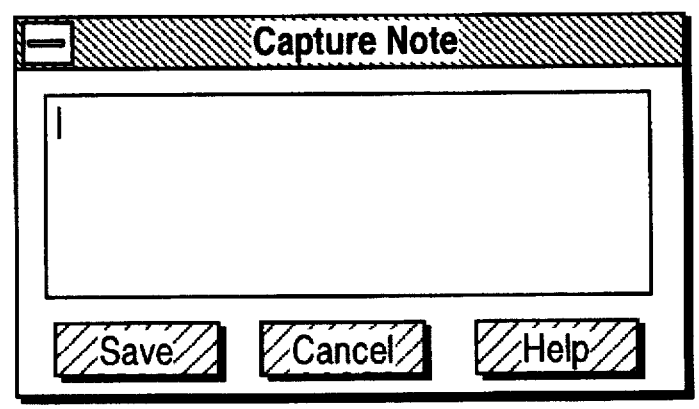
FIG. 5 is a depiction of the capture note display in accordance with one embodiment of the present invention.

The note making display is illustrated in FIG. 5. Notes appear at the top of the Time Line window, as in note 30 in FIG. 2, in the form of icons that can be prompted to display recorded text. The time at which a note was entered determines the point at which it appears in the Time Line indicating the exact time the note was taken during the survey. The user can configure the icon used to represent a note.

Figure 9:
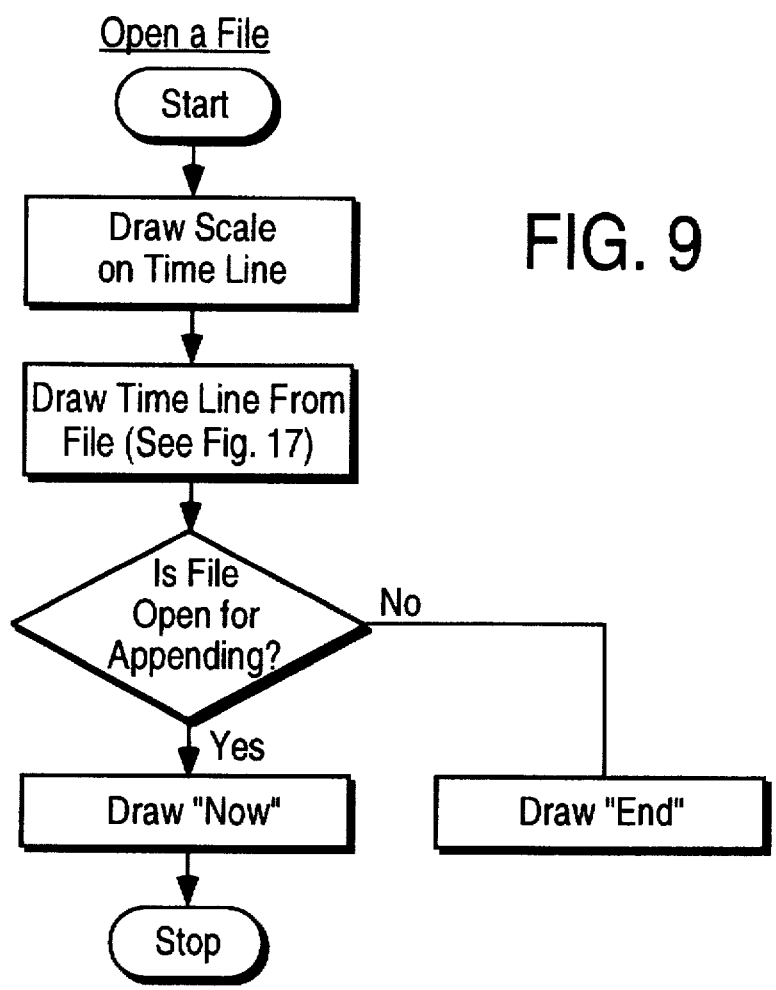
FIG. 9 is a flow diagram illustrating the steps to open a file in accordance with one embodiment of the present invention.

The steps necessary to open a new or existing data file are illustrated in the flow diagram of FIG. 9. When a new or existing data file is opened by the survey device, while the Time Line display is also open, each feature and note which appears in the data file will be drawn into the Time Line display at the appropriate location. The time at which the data file was created will be indicated with the word "Start". If the data file was opened for viewing only, then the word "End" will also appear at the point in time where the last item was appended to the data file. The method of drawing the time line from a file is discussed below in relation to FIG. 17.

If a new or existing data file is opened for appending, then the word "End" will not appear in the Time Line display. Instead, the word "Now" will appear at the current point in time, and this will advance along the Time Line moving towards the right as time progresses. Thus, word "Now" indicates the current time.

Figure 10:
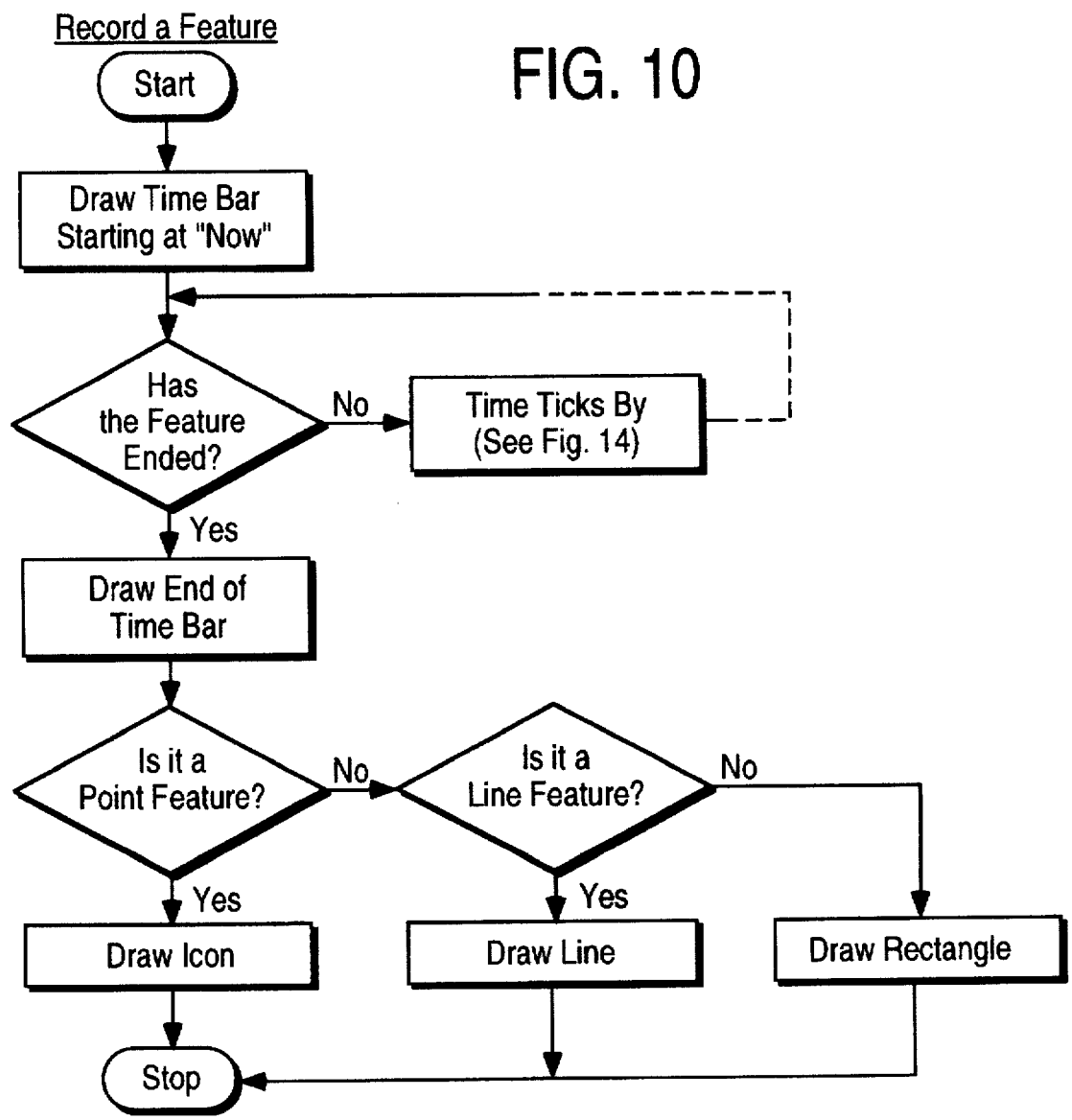
FIG. 10 is a flow diagram illustrating the steps to record a feature in accordance with one embodiment of the present invention.

The steps necessary for recording a feature are illustrated in flow diagram of FIG. 10. When the user starts to capture a feature, the Time Line begins to display a "time bar" from the moment in time that the feature first appears on the display. This "time bar" extends from that point to the word "Now", which indicates the current point in time. As time progresses, the "time bar" dynamically grows to indicate the passage of time.

When the user completes recording the feature or artifact, after having described its attributes and, if it is a line feature, having physically traversed the feature, the survey device displays either the icon associated with the feature if it is a point feature)or a line-rectangle in the configured color if it is a line/area feature. From this point on, the feature's "time bar" stops progressing with passing time and the word "Now" continues to progress to the right, indicating the continued passage of time. This process is discussed below with reference to FIG. 13.

If a user initiates a "nested" point feature while the user is recording a line or area feature, the point feature's "time bar" will appear above the line/area feature, and the line/area feature's "time bar" also continues to grow. When the nested point feature is recorded, the appropriate icon for that feature is displayed as described above and its associated "time bar" stops growing. The line/area feature's "time bar" continues to grow until the line/area feature is stopped. It is possible to nest many point features within a line or area feature. This is accomplished by using the Feature Layers display shown in FIG. 7.

The user can manipulate the information displayed in the Time Line window in a number of ways such as panning, zooming, scaling, selecting features to be included on the timeline and interacting with a two dimensional map display that records location data pertaining to features recorded on the Time Line display.

Figure 11:
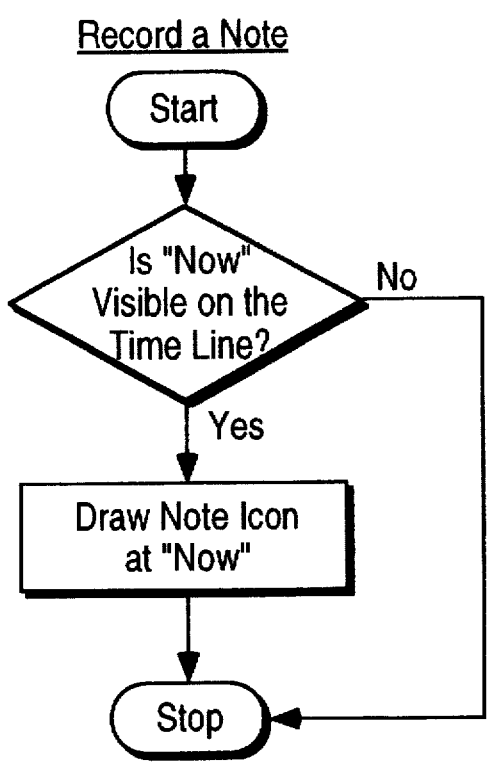
FIG. 11 is a flow diagram illustrating the steps to record a note in accordance with one embodiment of the present invention.

FIG. 11 illustrates the steps necessary to record a note pertaining to the survey. Once "NOW" is visible on the Time Line, indicating that the file is open for appending (See FIG. 9), the icon depicting a note is drawn at the "NOW" position.

Figure 6:
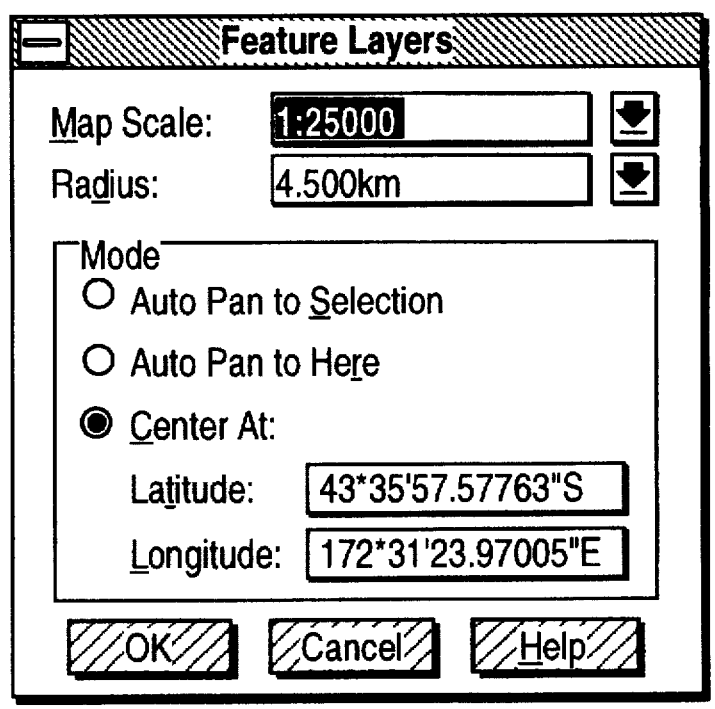
FIG. 6 is a depiction of the scale map display including auto pan features in accordance with one embodiment of the present invention.
Figure 7:
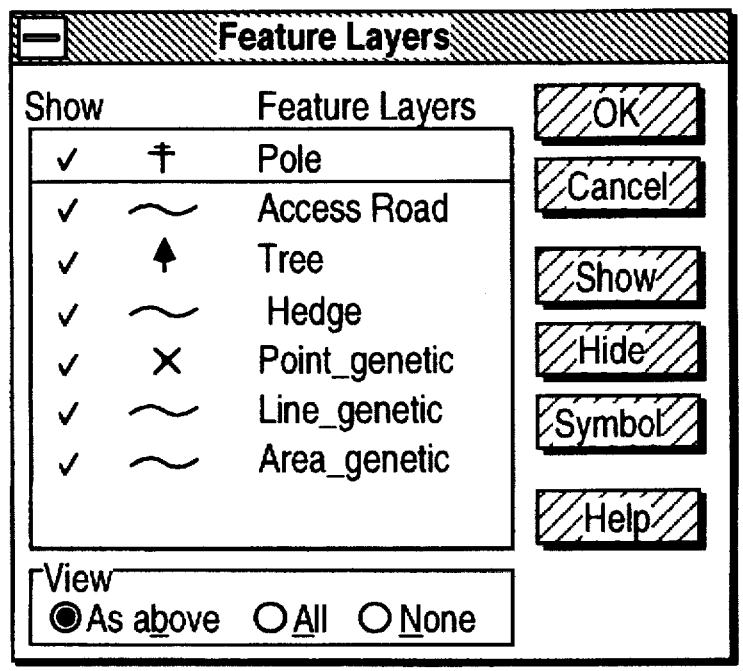
FIG. 7 is a depiction of the feature layers display including feature layers in accordance with one embodiment of the present invention.
Figure 14:
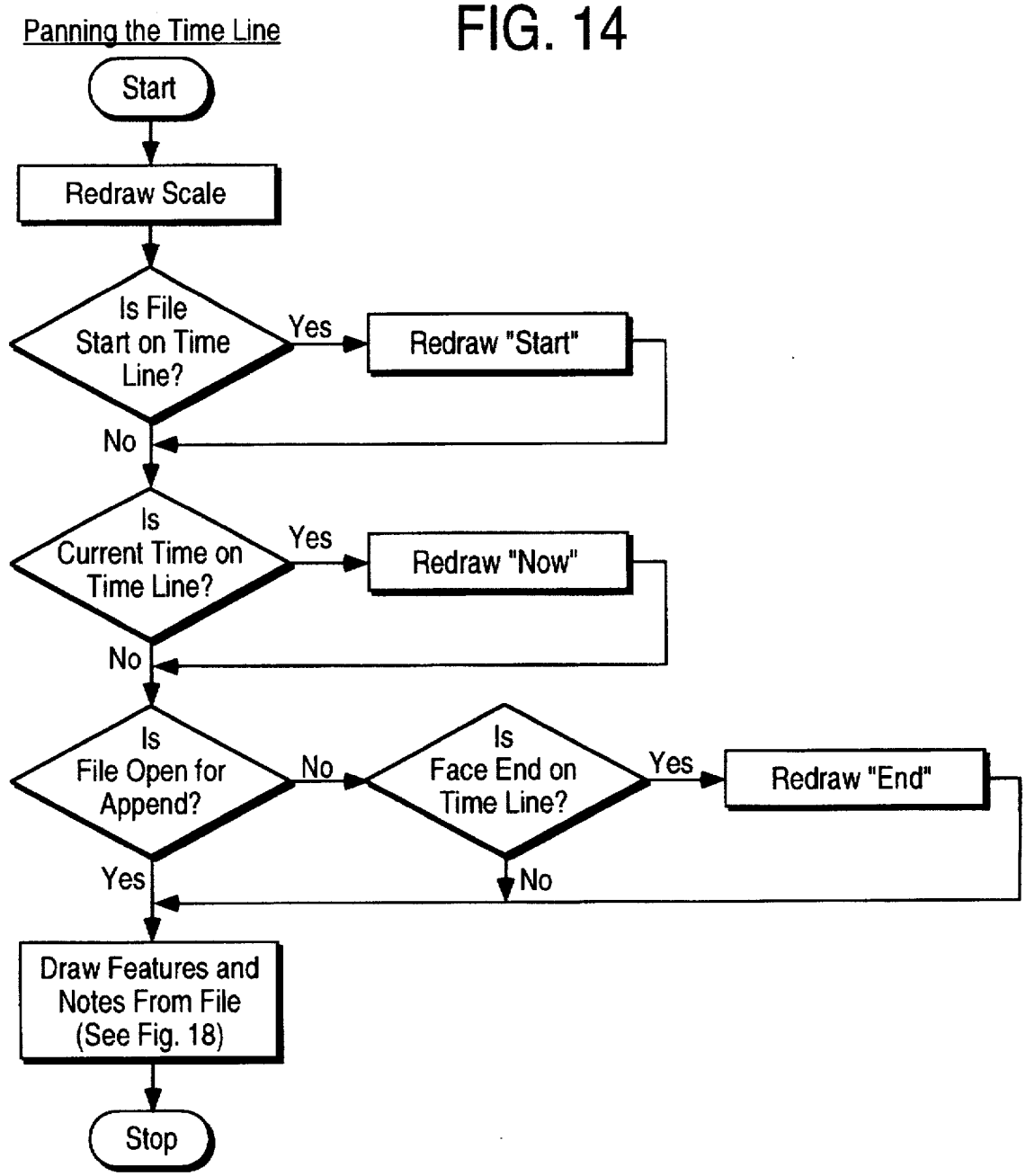
FIG. 14 is a flow diagram illustrating the steps necessary to pan the Time Line in accordance with one embodiment of the present invention.

The steps necessary for panning the contents of a Time Line are illustrated in the flow diagram of FIG. 14. The user can pan, or scroll in the horizontal dimension, the contents of the Time Line window to alter what is displayed. The display associated with panning is shown in FIG. 6. Panning can be achieved by clicking a panning tool on the Time Line window and dragging it in the required direction, or by clicking on the left or right scroll bar of the Time Line window.

Still referring to FIG. 14, the steps necessary to pan the Time Line display are illustrated. When the Time Line display is panned, its contents are redisplayed by first redrawing the scale and then determining whether the "START" appear on the display. If so, then "START" is redrawn. Next, the survey device determines whether the current time is on the Time Line display and, if so, redraws "NOW" on the Time Line display. Otherwise the query continues to determine whether the files opened for appending. If the file is open for appending, then the time display along with the features and notes from the file are drawn on the display according to FIG. 18 discussed below. If the file is not open for appending, a query is taken to determine whether "END" is on the Time Line. If "END" is on the Time Line, then it is redrawn. If "END" is not on the Time Line, then the features and notes from the file are redrawn according to FIG. 18.

The user can alter the amount of time displayed in the Time Line window by zooming in or out using zoom tools represented by icons. The steps necessary for zooming the Time Line are illustrated in the flow diagram of FIG. 15. To zoom in or out by a factor of 2, the user simply clicks the appropriate zoom tool on the Time Line display. The point in the Time Line at which it is clicked will become the center of the zoomed Time Line window. To zoom in or out by a variable amount, the user can click and drag along the Time Line. The resulting line determines either the portion of the Time Line which should be visible after zooming in, or the length of the Time Line window into which its currently visible contents should be drawn after zooming out. The user can zoom the Time Line window to display the full extents of the data file showing the entire contents from "Start" to "End"/"Now" using the a global zoom tool.

Figure 8:
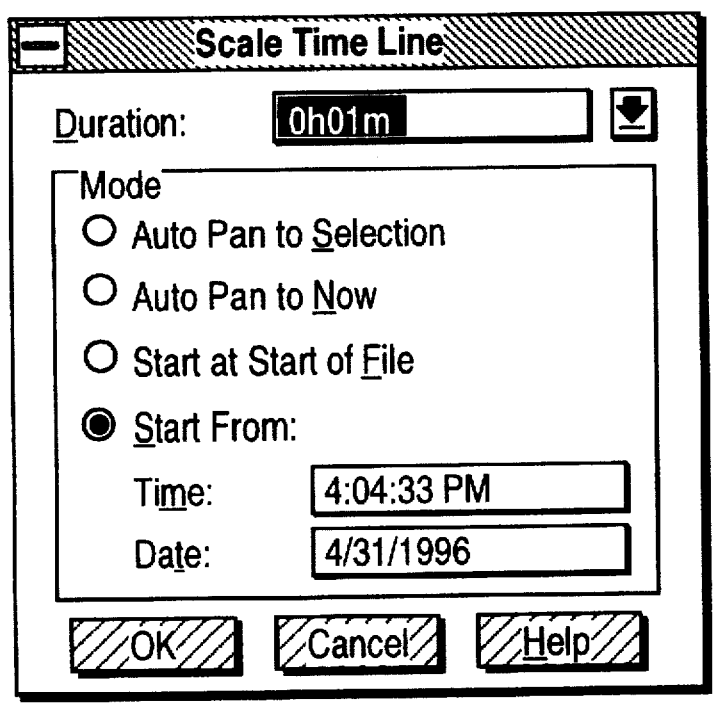
FIG. 8 is a depiction of the scaling mechanism for the time line window display in accordance with one embodiment of the present invention.

The user can specify the duration to be displayed, and also the mode in which the Time Line window should operate, via the "Scale Time Line" dialog. The display pertaining to scaling the timeline is illustrated in FIG. 8. The user can specify the time duration to be displayed in the Time Line window by filling in the "Duration" field. They can also specify whether, the Time Line window should first be automatically panned so that any selected feature or note will be visible. These items could be selected as the result of a search operation, or as a result of selection in the map window or the Feature Editor. Second, they can specify whether the Time Line window should automatically pan to the left so as to keep the current point in time, i.e. "Now, on the right-hand-side of the window. Third, they can specify whether the Time Line window should pan so that the start of the data file ("Start") is visible on the left-hand-side of the window. Finally, they can specify whether the Time Line window should pan to a particular point in time.

The user can select a feature or a note on the Time Line using a selection tool depicted by an icon. The steps required are illustrated in the flow diagram of FIG. 17. A selected feature is highlighted on the Time Line window, and also on the Map window if that window is open. If the Feature Editor window is open when a feature is selected in the Time Line window, then the Feature Editor will display the attributes of the selected feature for viewing, editing or deletion of the feature. Similarly, if the Feature Editor is used to step through features and notes in the data file, the Map and Time Line windows will highlight the feature/note currently displayed by the Feature Editor.

Figure 12:
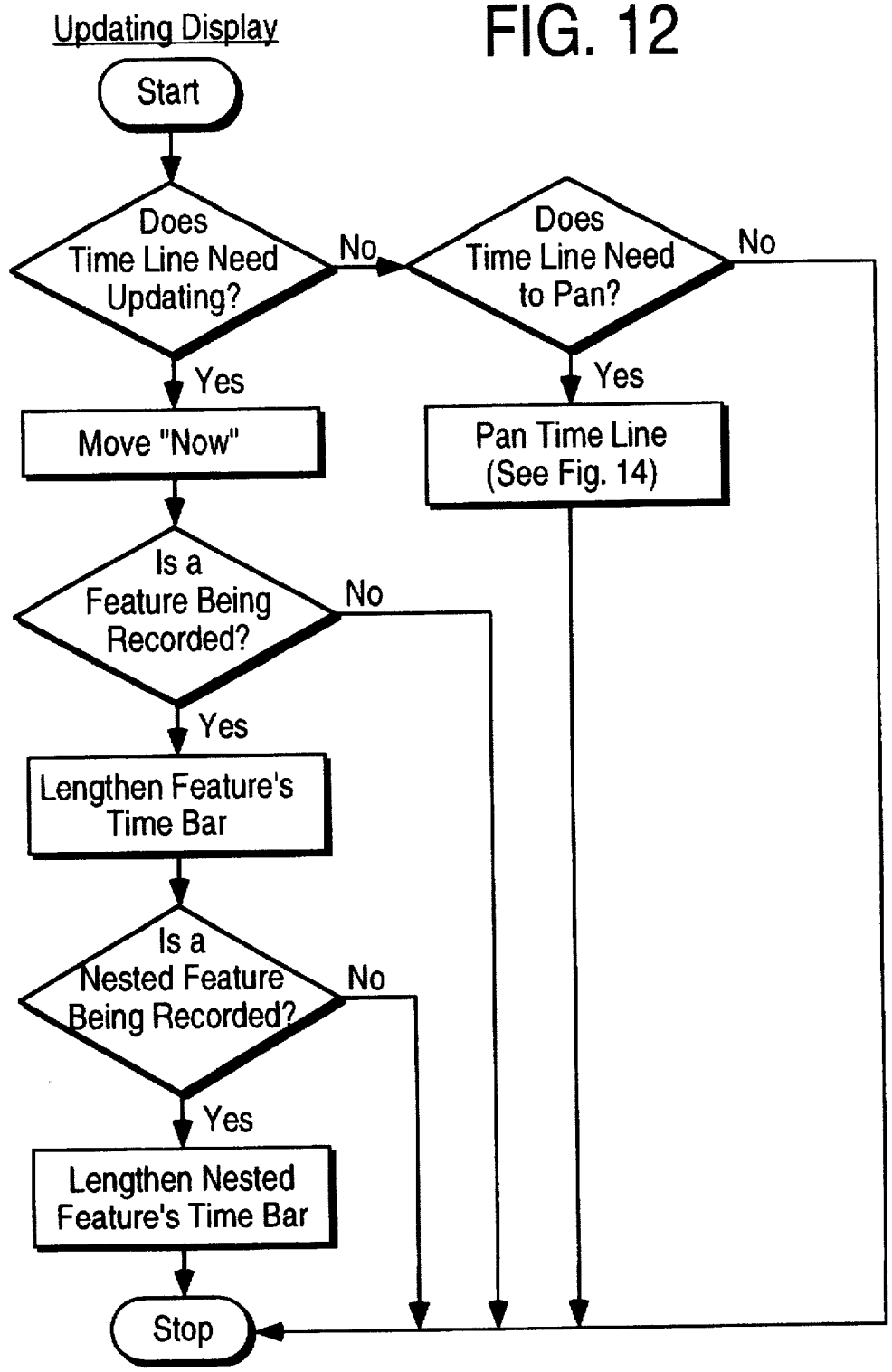
FIG. 12 is a flow diagram illustrating the steps that the survey device takes in updating the information on the time display while time passes during the survey in accordance with one embodiment of the present invention.

FIG. 12 illustrates the steps necessary to update the Time Line display by adjusting the contents of the display. As time ticks by in the internal clock of the survey device, the display must be updated. If the display needs updating, the "NOW" indicator moves following the time scale as time passes. If a feature is being recorded, the features time bar continues until recording has been completed. Similarly, if a nested feature is being recorded, the nested features time bar is lengthened as time passes. Once a feature or nested feature has been recorded, the process ends. Also, if the Time Line needs to be panned, updating the display required panning the Time Line according to FIG. 13 discussed below.

Figure 13:
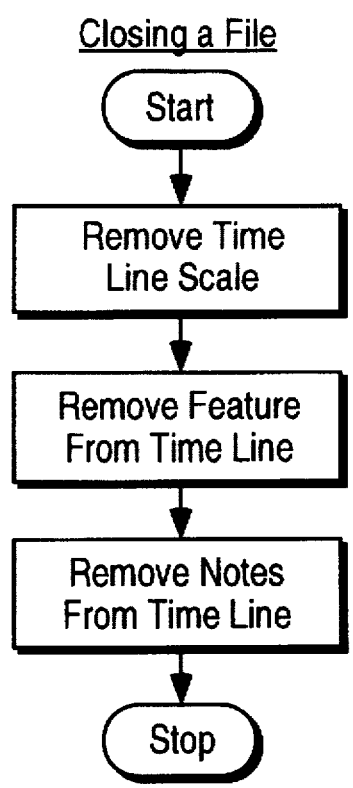
FIG. 13 is a flow diagram illustrating the steps to close a file in accordance with one embodiment of the present invention.

Referring to FIG. 13, the steps necessary to close a file are illustrated. In closing a file, the Time Line scale, the features from the Time Line scale display and the notes from the Time Line display are removed respectively.

Referring to FIG. 17, the steps necessary to select a feature from the map display or feature editor are illustrated. When a feature is selected on the map display or in feature editor, the contents of the Time Line are redisplayed as follows. First, a determination is made whether another feature is currently highlighted. If it is, the other feature is redrawn on the line. Otherwise, a query is made whether the selected feature is visible on the line. If not, a determination is made whether the pan feature has been selected. If it has, then panning the Time Line is required according to the steps in FIG. 14 above. Otherwise, the process is ended. If the selected feature is visible on the line, then the feature is highlighted on the line.

Figure 18:
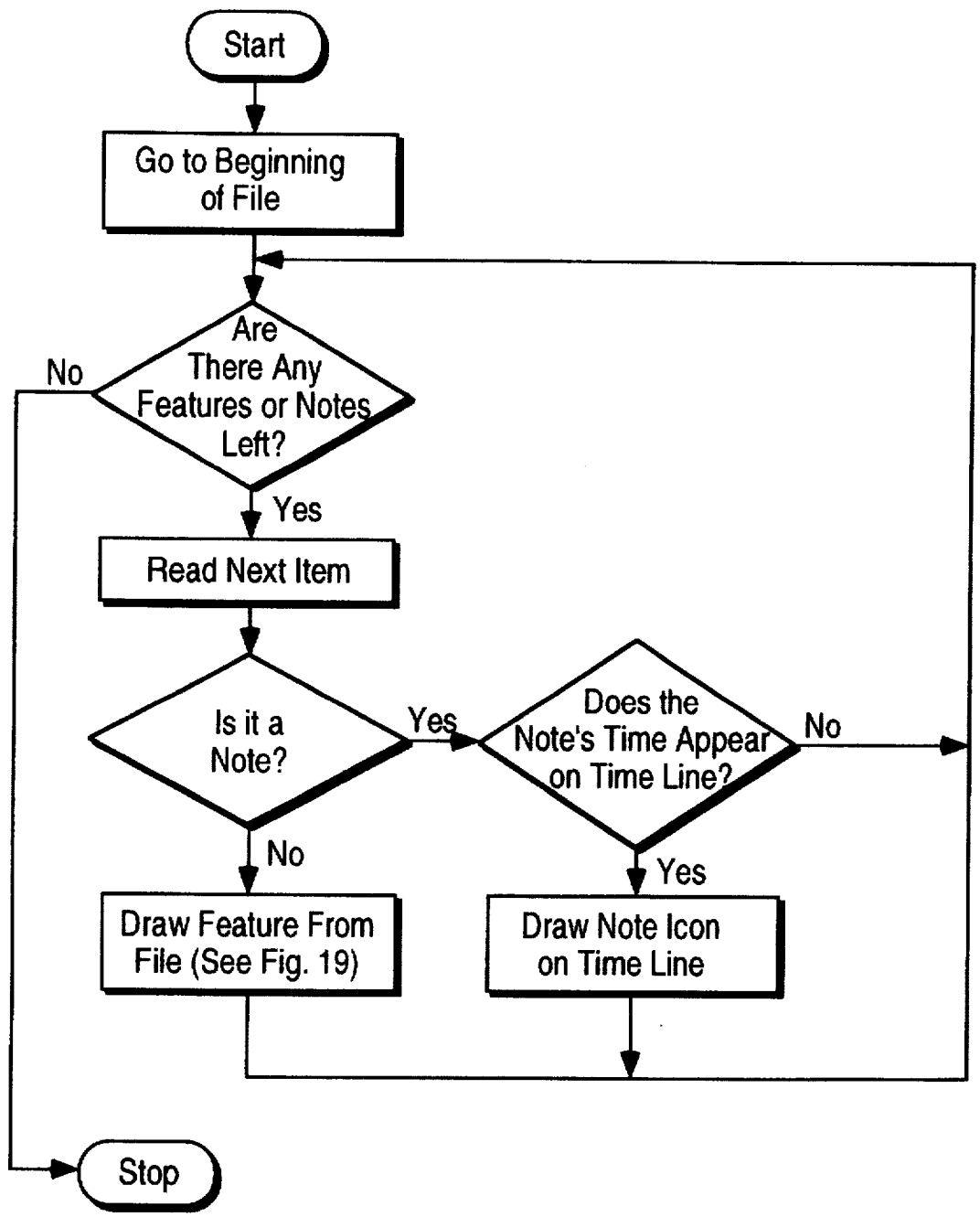
FIG. 18 is a flow diagram illustrating the steps necessary to draw a Time Line from a file in accordance with one embodiment of the present invention.

Referring now to FIG. 18, the steps necessary to draw a Time Line display from a file are illustrated. Whenever the contents of a Time Line display need to be redrawn, for example, as the result of opening a file, panning or zooming the Time Line display, the sequence of operations occur as follows. First, the survey display device goes to the beginning of the file. Then the display device determines whether there are any features or notes remaining. If so, the next item is read in the file. If it is a note, then the survey device determines whether the note's time appears on the Time Line. If so, then the note icon is drawn on the Time Line and the determination returns to whether any features or notes are left in the file. If it is not a note, then a feature is drawn from the file according to FIG. 19 discussed below. Once features or notes are no longer remaining, then the drawing of the Time Line from the file is completed.

Figure 19:
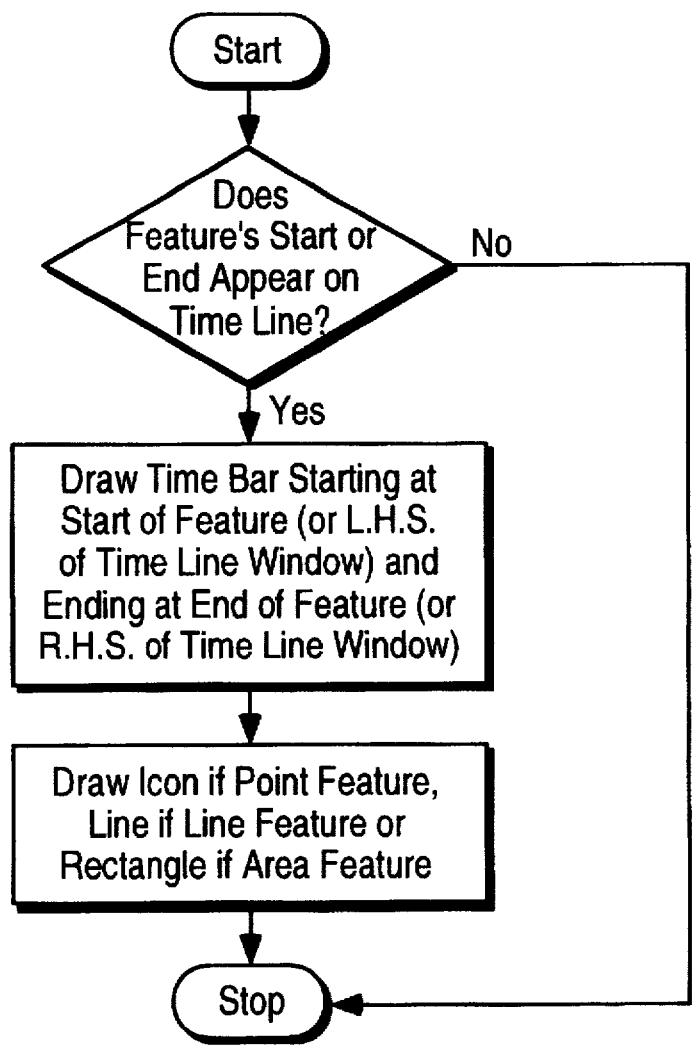
FIG. 19 is a flow diagram illustrating the steps necessary to draw a feature from a file in accordance with one embodiment of the present invention.

Referring to FIG. 19, the steps necessary to draw a feature from a file are illustrated. Whenever a feature which has been previously recorded needs to be redrawn, for example, as a result of opening a file, panning or zooming the Time Line, the sequence of operations required occurs as follows. First, the survey device determines whether the features start or end indicators appear on the Time Line. If not, the feature is not drawn from the file. Otherwise, a time bar starting at the start of the feature, or the left hand side of the Time Line window and ending at the end of the feature, or at the Line window is of the Time Line window is drawn. Then if a point feature is indicated, the icon of the point feature is drawn. Similarly, if a line feature is indicated, a line is drawn and if an area feature is indicated, a rectangle is drawn.

The Time Line and the Map window, illustrated in FIGS. 2 and 3 respectively, and the Feature Editor provide different views of the same data file. Each is dynamically updated as new features are recorded. The Map window provides a spatial or geographical plan view of the data which is captured, while the Time Line and Feature Editor provide chronological views of features and notes. The Feature Editor uses chronological ordering merely as a convenient way to present the attribute information for each feature in turn, whereas the Time Line is a to-scale representation of the events which occurred, and continue to occur, as features and notes are recorded.

Features which are displayed on the Time Line use the user-configured icons for point features and user-configured colors for line and area features. It is useful to display features the same icons and colors. This makes it easy to identify features of a particular type on both the Map and Time Line windows.

The Map, Time Line and Feature Editor windows are "synchronized" which makes it easy for users to search for features of interest in any or all of these windows. It is often easier to identify a particular feature in one of these windows than in another window. For example, the user may know that an attribute value was entered incorrectly for the last carrier-phase point feature, but may not be sure which feature this is the Map window. Because carrier-phase point features require the user to log data for a period of time, the user can easily see the feature of interest in the Time Line window with its "time bar" being quite long. The user can click on this feature to select it in the Time Line. The survey device software will automatically highlight that feature in the Time Line, Map and Feature Editor windows, so the user can see where the feature is in the Map window and can edit its attributes in the Feature Editor. The Time Line window makes it particularly easy to identify nested point features which cannot easily be identified in the Map or Feature Editor windows.

The embodiment of the present invention discussed above is a very useful general purpose GPS field survey tool. There are a number of possible enhancements of this implementation which can make the Time Line window even more useful as a data viewing and analysis tool for different applications.

These enhancements center around the fact that, together with a time axis and captured features and notes, the Time Line window can also be used to display information about the GPS conditions which can prevail at the time these features and notes are recorded. The useful GPS information which could conceivably be displayed in the Time Line window are set forth below.

Figure 20:
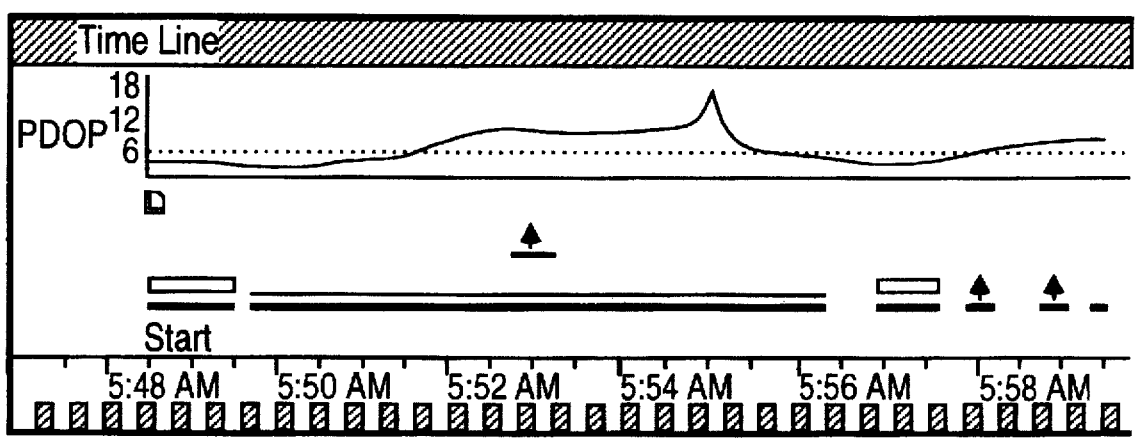
FIG. 20 is a depiction of the Time Line display showing the GPS PDOP heuristic in accordance with one embodiment of the invention.

The prevailing position dilution of precision (PDOP) information would be very useful to an operator in the field performing a survey. PDOP is a heuristic from which an estimate can be made of the degradation in accuracy of GPS positions due to satellite geometry. A high PDOP value implies reduced positional accuracy, while a low PDOP implies increased positional accuracy. The survey device can allow the user to elect whether or not to log PDOP information. An example is shown in FIG. 20. In the event that this information was, or is being, logged, the logged PDOP values can be plotted on the Time Line. If PDOP information is not being logged, the survey device software can reconstruct an estimate of the prevailing PDOP values using the ephimerides for each satellite and the record of which satellites are being used for position fixes at any point in time. This calculated value is likely to be identical to the logged PDOP value except in the case of a malfunctioning GPS receiver or an irregularity in the GPS system itself.

Figure 21:
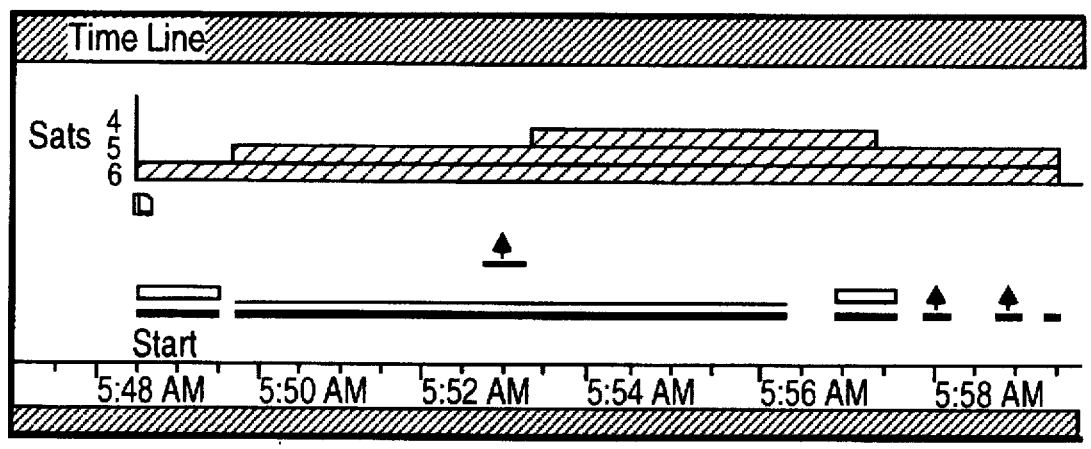
FIG. 21 is a depiction of the Time Line display showing the number of satellites in accordance with one embodiment of the invention.

The number of satellites being used to compute position fixes is often of interest. At any point in time, the survey device can tell which satellites were (are) being used to compute GPS positions, and can indicate this on the Time Line. An example of a Time Line window with the number of satellites used for position fixes displayed is shown in FIG. 21.

Figure 22:
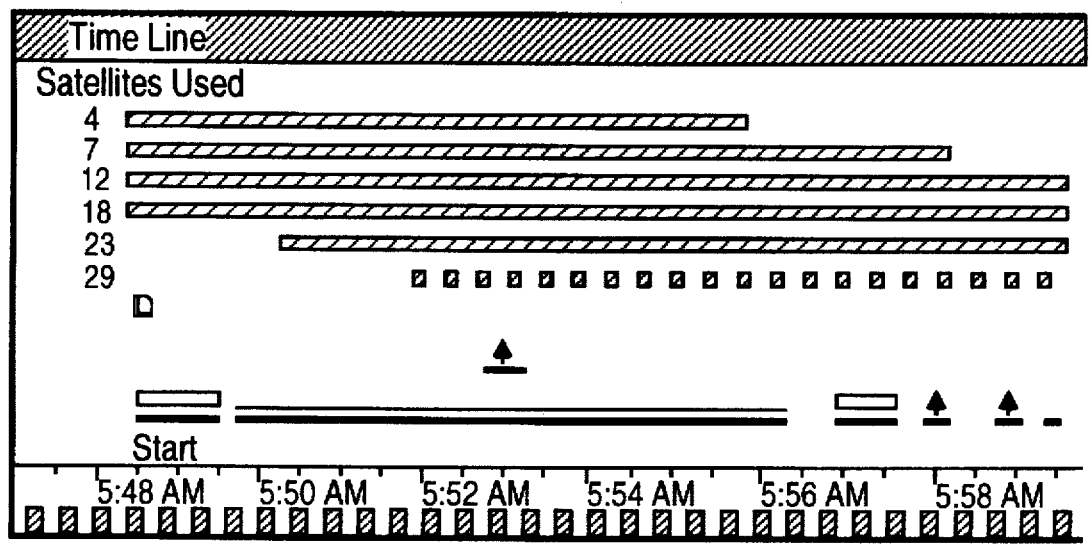
FIG. 22 is a depiction of the Time Line display showing the satellites used to compute GPS positions in accordance with one embodiment of the invention.
Figure 23:
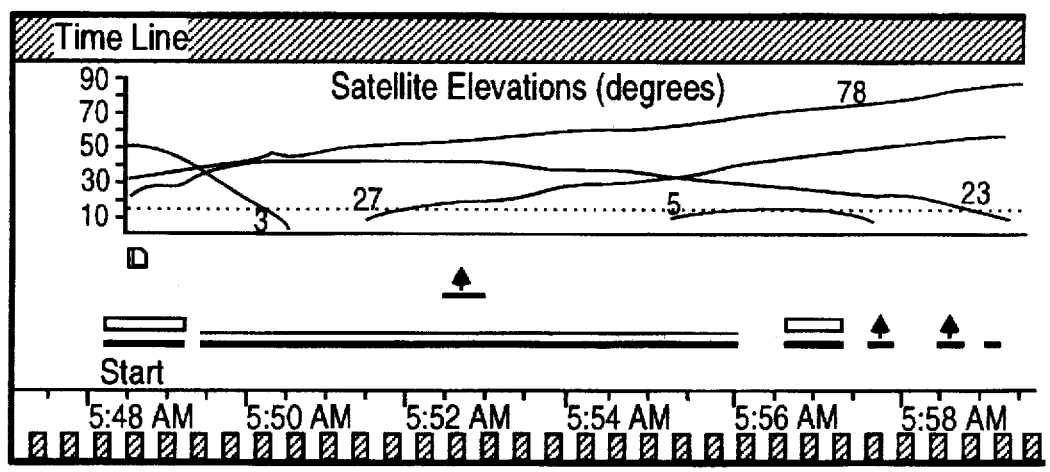
FIG. 23 is a depiction of the Time Line display showing satellite elevations in accordance with one embodiment of the invention.

The satellites which were being used for position fixes. At any point in time, the survey device can tell which satellites were (are) being used for computing GPS positions, and can indicate this on the Time Line. The indication could merely note the satellite PRN numbers, or could embellish this information by indicating the elevation of each satellite which is being used. Examples of a Time Line window with satellite PRNs and satellite elevations displayed as shown in FIGS. 22 and 23 respectively.

Figure 24:
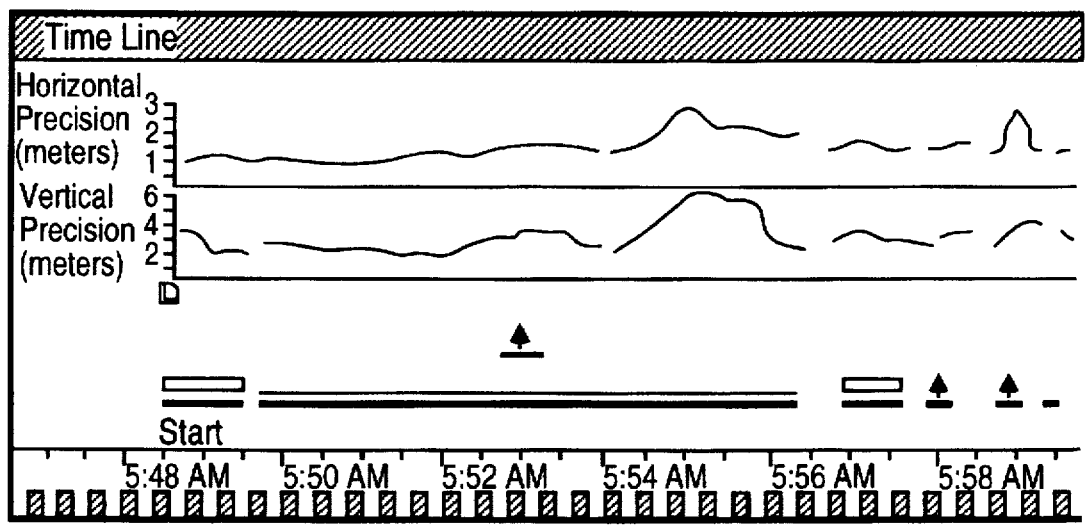
FIG. 24 is a depiction of the Time Line display showing GPS position precision heuristics in accordance with one embodiment of the invention.

In the presence of (real-time or post-processed) differential correction, it is possible for a GPS receiver to compute heuristic precision values, which are estimates of the accuracy of the GPS positions currently being produced. These precision values can be logged to provide quality assurance and quality control information to the eventual users of the captured data, or can be displayed to the user of the survey device field Software to allow him/her to ensure that each feature is captured to a required degree of accuracy. The precision values take account of the PDOP heuristic, but also consider a whole range of other factors, and in the presence of sufficient satellites the precision heuristics are very reliable indicators. precision values are typically displayed as horizontal and vertical components, in meters or feet, but can be amalgamated into a single three-dimensional accuracy estimate. See FIG. 24 for an example of a Time Line window with precision values displayed.

Without a doubt, there are other, more detailed and specialized position system phenomena which might be displayed in the Time Line window. These would tend to be more for technical support engineers to perform sophisticated analysis and problem solving, whereas the suggested enhancements listed above might be useful for typical users of the survey device Field Software. Of course, it is perfectly possible to implement more than one of these enhancements, and possibly all of them, as the one-dimensional nature of the Time Line window permits multiple streams of time-ordered information to be displayed simply by increasing the height of the Time Line window.

The survey device could also indicate on the Time Line the periods when GPS positions were and were not logged. It could easily do so, by drawing a trail of dots beneath the "time bar" of each feature. It could also indicate "not-in-feature" positions, that is, positions logged between features.

It is important to appreciate that the display of GPS information such as PDOP values and satellite numbers differs from GPS Mission Planning in one important sense. This is the fact that the information displayed on the survey device Time Line is what actually happened, whereas the information displayed by Mission Planning software is what will theoretically will happen.

In most circumstances, Mission Planning software will be optimistic about satellite visibility, and will therefore describe the satellites which would seen in the absence of any obstructions. Mission Planning suites such as the Trimble QuickPlan software allow a user to manually construct "curtains" which describe expected obstructions such as mountain ranges, but it is difficult to anticipate momentary obstructions such as a passing truck, etc.

Of course, it is possible to blur the distinction between the GPS information which was logged as it was observed and the information which might be observed in the near future. The Time Line could display the information which has been logged up until "Now", and could then switch to displaying calculated Mission Planning information. This would provide the user with on-the-fly Mission Planning which could warn them of impending periods of high PDOP or poor satellite coverage. A desirable implementation would show the theoretical or "best" PDOP values which would be achieved if all satellites above the current elevation mask were visible, but should also show the "anticipated" PDOP which will be achieved using the current satellite constellation.

Thus, a novel method and apparatus of surveying using a surveying apparatus with a user interface having a timeline display and a two dimensional map area display has been described. While the preferred embodiment of the surveying apparatus and method have been described in detail in connection with the figures, it should be understood that the description and figures are illustrative only and, as such, the present invention should only be limited in terms of the claims which follow.

What is claimed is:

1. A computer-assisted method of collecting data utilizing a data collecting apparatus having a data receiver, a processor, a display screen and a memory, the method comprising:

initiating a time based recording algorithm for recording data collection activities and identifying the data collection activities by time collected;

displaying a time based display for displaying information from the time based recording algorithm;

identifying a first artifact with an icon and displaying the icon on the time based display;

initiating a time duration indicator on the time based display to indicate the duration of the data collection period;

initiating the collection of measurement data pertaining to the first artifact using the data receiver;

initiating the collection of attribute information corresponding to the first artifact and displaying an initiating indicator on the time based display; and associating the attribute information and the icon for the first artifact in a data structure in the memory.

2. A computer-assisted method of collecting data according to claim 1 further comprising stopping the collection of measurement data when the measurement of the first artifact has been determined to a predefined accuracy and displaying a stop indicator on the time based display.

3. A computer-assisted method of collecting data according to claim 2 wherein the data collecting apparatus further includes an icon representation stored in memory and wherein identifying the first artifact comprises:

selecting an icon from the icon representation, wherein the data collecting apparatus recognizes the icon as indicative of the first artifact to be studied and defines the predetermined accuracy within which the first artifact is studied.

4. A computer-assisted method of collecting data according to claim 2 wherein initiating the collection of attribute information comprises:

sending a command to the user interface, the command being received by the microprocessor, the microprocessor generating a first signal in response thereto, the first signal being recognized by the data collecting apparatus as being indicative of time based information defining time based measurement information for the first artifact.

5. A computer-assisted method of collecting data according to claim 2, the method further comprising displaying a menu of possible artifact descriptions before identifying the first artifact with an icon, wherein identifying the first artifact with an icon comprises selecting the icon from a menu of possible icons.

6. A computer-assisted method of collecting data according to claim 2 the method further comprising displaying a menu of possible artifact descriptions before identifying the first artifact with an icon, wherein identifying the first artifact with an icon comprises selecting the icon from the menu of possible icons.

7. A computer-assisted method of collecting data according to claim 1, the method further comprising displaying a menu of possible icons for the first artifact before initiating the collection of attribute information regarding the first artifact, wherein initiating the collection of attribute information comprises selecting the attribute information from the menu of possible icons.

8. A computer assisted method of collecting data according to claim 2, the method further comprising displaying the status of the collection of measurement information after initiating the collection of measurement information.

9. A computer assisted method of collecting data according to claim 8 wherein displaying the status of the collection of measurement information comprises displaying the status using icons.

10. A computer assisted method of collecting data according to claim 8 wherein displaying the status of the collection of measurement information comprises displaying the status using LEDs.

11. A computer assisted method of collecting data according to claim 8 wherein displaying the status of the collection of measurement information comprises displaying the status using textual information.

12. A computer assisted method of collecting data according to claim 8 wherein displaying the status of the collection of measurement information comprises displaying status using graphical information.

13. A computer-assisted method of collecting data utilizing a surveying apparatus having a Global Positioning System (GPS) receiver, a processor, a display screen and a memory, the method comprising:

initiating a time based recording algorithm for recording activities performed during a surveying project in real time and generating time based information;

displaying a time based display for displaying information from the time based recording algorithm;

positioning the surveying apparatus at a first location corresponding to a first artifact to be studied;

identifying the first artifact with an icon and displaying the icon on the time based display;

initiating a time duration indicator on the time based display to indicate the duration of the study;

initiating the collection of position information for the first artifact using the GPS receiver;

initiating the collection of attribute information corresponding to the first artifact and displaying an initiating indicator on the time based display; and associating the attribute information and the icon for the first artifact in a data structure in the memory.

14. A computer-assisted method of surveying according to claim 13 further comprising stopping the collection of position information when the location of the first artifact has been determined to a predefined accuracy and displaying a stop indicator on the time based display.

15. A computer-assisted method of surveying according to claim 13 wherein the surveying apparatus further includes an icon memory stored in memory and wherein identifying the first artifact comprises:

selecting an icon from the icon memory, wherein the surveying apparatus recognizes the icon as indicative of the attribute to be studied and defines the predetermined accuracy within which it is studied.

16. A computer-assisted method of surveying according to claim 13 wherein initiating the collection of attribute information comprises:

sending a command with the user interface, the command being received by the microprocessor, the microprocessor generating a first signal in response thereto, the first signal being recognized by the surveying apparatus as being indicative of time based information defining time based surveying information for the first artifact.

17. A computer-assisted method of surveying according to claim 13 wherein the step of initiating the collection of position information comprises:

initiating a second command, the second command being received by the microprocessor, the microprocessor generating a second signal in response thereto, the second signal being recognized by the surveying apparatus as being indicative of a command to initiate the collection of positioning information.

18. A computer-assisted method of surveying according to claim 13, the method further comprising displaying a menu of possible artifact descriptions before identifying the first artifact with an icon, wherein identifying the first artifact with an icon comprises selecting the icon from a menu of possible icons.

19. A computer-assisted method of surveying according to claim 13, the method further comprising displaying a menu of possible icons for the first artifact before initiating the collection of attribute information regarding the first artifact, initiating the collection of attribute information comprising selecting the attribute information from the menu of possible icons.

20. A computer assisted method of surveying according to claim 13, the method further comprising displaying the status of the collection of position information after initiating the collection of position information.

21. A computer assisted method of surveying according to claim 20 wherein displaying the status of the collection of position information comprises displaying the status using icons.

22. A computer assisted method of surveying according to claim 20 wherein displaying the status of the collection of position information comprises displaying the status using LEDs.

23. A computer assisted method of surveying according to claim 20 wherein displaying the status of the collection of position information comprises displaying the status using textual information.

24. A computer assisted method of surveying according to claim 20 wherein displaying the status of the collection of position information comprises displaying status using graphical information.

25. A data collection device configured to collect data pertaining to an artifact comprising:

a system bus;

a measurement device configured to collect measurement information pertaining to an artifact to be measured, the measurement device configured to communicate with the system bus;

a memory configured to communicate with the system bus;

a display configured to communicate with the system bus;

a user interface configured to communicate with the system bus, the user interface configured to receive attribute information from a user regarding the artifact;

a microprocessor configured to communicate with the system bus, the microprocessor configured to receive the measurement information from the measurement device, the attribute information from the user interface and configured to generate time based information in response to a system clock and in response to the attribute information, configured to associate the information pertaining to the artifact with time based information and the attribute information for the artifact, configured to store the measurement information for the artifact and the attribute information for the artifact in a data structure in the memory and configured to display the time based information on the display.

26. A data collection device according to claim 25 wherein the microprocessor is configured to transmit signals representing a menu of possible icons to the display, such that the menu is displayed on the display in order to prompt the user to enter an icon representing the artifact and wherein the microprocessor is configured to transmit signals representing a time based diary of measurement information, attribute information and time based information to be displayed on the display and recorded in memory.

27. A data collection device according to claim 25 wherein the microprocessor is configured to receive signals from the measurement device indicating the status of the collection of measurement information and to transmit signals representing the status of the collection of measurement information to the display such that the status of the collection of measurement information is displayed on the display.

28. A data collection device according to claim 25 wherein the user interface includes a touch sensitive display configured to receive commands from a user in response to user interaction with the touch sensitive screen.

29. A data collection device according to claim 26 wherein the microprocessor is configured to generate geographical information using the measurement information and to transmit signals representing a display of geographical locations of artifacts represented using icons.

30. A data collection device according to claim 26 wherein the microprocessor is configured to transmit signals representing a submenu of possible attributes of the artifact to the display, such that the submenu is displayed on the display in order to prompt the user to enter attribute information for the artifact.

31. A data collection device comprising:

a system bus a GPS receiver configured to communicate with the system bus, the GPS receiver generating position information regarding the position of an artifact;

a memory configured to communicate with the system bus;

a display configured to communicate with the system bus;

a user interface configured to communicate with the system bus, the user interface configured to receive attribute information from a user regarding the artifact;

a microprocessor configured to communicate with the system bus, the microprocessor configured to receive the position information from the GPS receiver, the attribute information from the user interface and configured to generate time based information in response to a system clock and in response to the attribute information, configured to associate the position information for the artifact with time based information and the attribute information for the artifact, configured to store the position information for the artifact and the attribute information for the artifact in a data structure in the memory and configured to display the time based information on the display.

32. A data collection device according to claim 31 wherein the microprocessor is configured to transmit signals representing a menu of possible icons to the display, such that the menu is displayed on the display in order to prompt the user to enter an icon representing the artifact and wherein the microprocessor is configured to transmit signals representing a time based diary of position information, attribute information and time based information to be displayed on the display and recorded in memory.

33. A data collection device according to claim 31 wherein the microprocessor is configured to receive signals from the GPS receiver to indicate the status of the collection of position information and configured to transmit signals representing the status of the collection of position information to the display such that the status of the collection of position information is displayed on the display.

34. A data collection device according to claim 31 wherein the user interface includes a touch sensitive display configured to receive commands from a user in response to user interaction with the touch sensitive screen.

35. A data collection device according to claim 32 wherein the microprocessor is configured generate geographical information using the position information and to transmit signals representing a display of geographical locations of artifacts represented using icons.

36. A data collection device according to claim 32 wherein the microprocessor is configured to transmit signals representing a submenu of possible attributes of the artifact to the display, such that the submenu is displayed on the display in order to prompt the user to enter attribute information for the artifact.

37. A computer-assisted method of collecting data on artifacts, each artifact associated with a data collection activity identified by a time stamp, the method comprising:

generating a time based display comprising the steps of
displaying a timeline; and
displaying an icon on the timeline at a location on the timeline corresponding to a time indicated by the time stamp.

38. The computer-assisted method of claim 37, wherein the method further comprises initiating collection of measurement data pertaining to a first artifact.

39. The computer-assisted method of claim 38, wherein the method further comprises stopping the collection of measurement data when the measurement of the first artifact has been predetermined to a predefined accuracy and displaying a stop indicator on the time based display.

40. The computer-assisted method of claim 39, wherein generating a time based display further comprises identifying a first artifact with an icon, wherein the icon is indicative of the accuracy within which the first artifact is measured.

41. The computer-assisted method of claim 40, wherein the method further comprises generating geographical information using the measurement information; and displaying the status of the collection of geographical information after initiating the collection of measurement data.

42. A data collection device configured to record data and time based information pertaining to artifacts, comprising:

a display;

a measurement device configured to collect measurement data pertaining to an artifact to be measured;

a microprocessor configured to receive measurement data from the measurement device and configured to generate time based information in response to a clock, the microprocessor configured to associate an icon with the measurement information and to display the icon on a timeline on the display at a location on the timeline corresponding to a time indicated by the time based information.

43. The data collection device of claim 42, wherein the data collection device further comprises:

a user interface configured to communicate with the microprocessor, the user interface configured to receive attribute information from a user regarding the artifact, the microprocessor configured to receive the attribute information from the user interface.

44. The data collection device of claim 43, wherein the microprocessor is configured to receive signals from the measurement device to indicate the status of the collection of measurement data and configured to transmit signals representing the status of the collection of measurement data to the display such that the status of the collection of position information is displayed on the display.

45. The data collection device of claim 44, wherein the measurement data is position data.

46. The data collection device of claim 45, wherein the microprocessor is configured to generate geographical information using the position data and to transmit signals representing a display of geographical locations of artifacts represented using icons.

* * * * *

UNITED STATES PATENT AND TRADEMARK OFFICE
CERTIFICATE OF CORRECTION

PATENT NO.   : 5,731,997
DATED        : March 24, 1998
INVENTOR(S)  : Manson et al.

Page 1 of 1

It is certified that error appears in the above-identified patent and that said Letters Patent is hereby corrected as shown below:

Column 11,
Line 11 delete "dose" and insert --close--
Lines 54-55 delete "Line window is" and insert --right hand side--

Signed and Sealed this

Twenty-sixth Day of June, 2001

*Attest:*

NICHOLAS P. GODICI
*Attesting Officer*   Acting Director of the United States Patent and Trademark Office